No. 629,834. Patented Aug. 1, 1899.
G. B. WEBB.
MEASURING FAUCET.
(Application filed Jan. 18, 1898.)
(No Model.) 2 Sheets—Sheet 1.
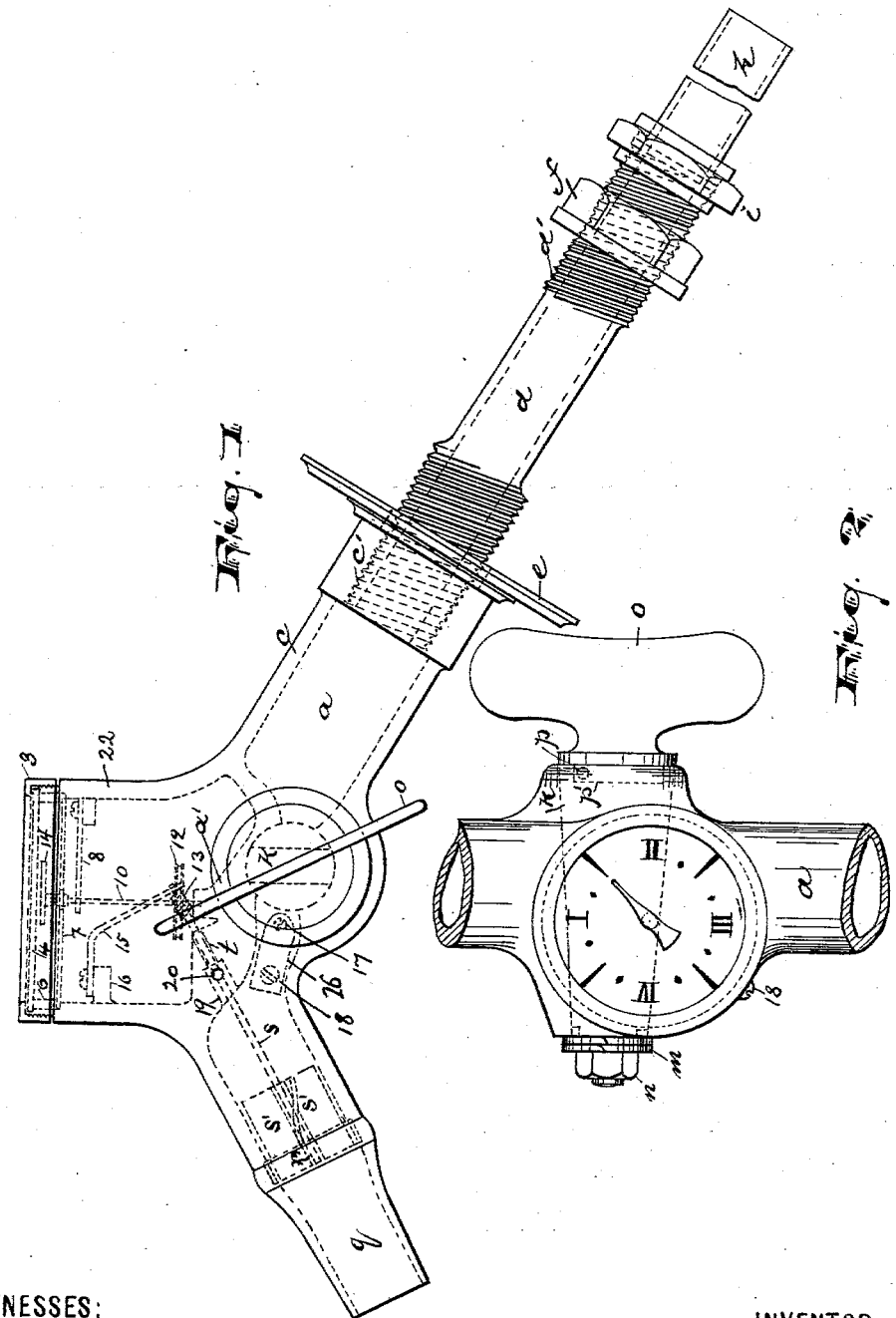
WITNESSES:
A. R. Krousse
Russell M. Everett
INVENTOR:
George B. Webb,
BY Drake & ATTY'S.

No. 629,834.　　　　　　　　　　　　　　Patented Aug. 1, 1899.
G. B. WEBB.
MEASURING FAUCET.
(Application filed Jan. 18, 1898.)
(No Model.)　　　　　　　　　　　　　　　　2 Sheets—Sheet 2.
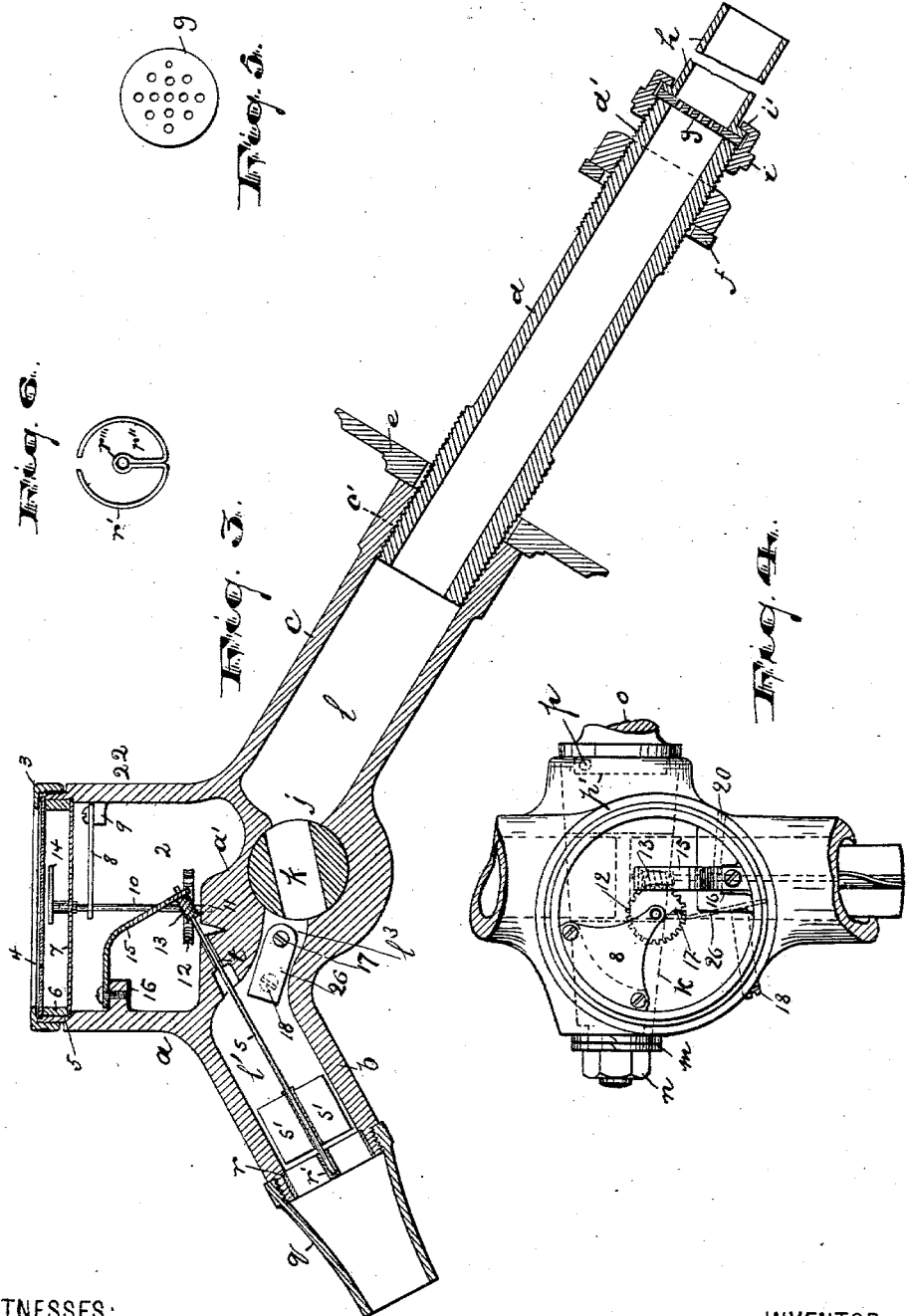
WITNESSES:　　　　　　　　　　　　　　　　INVENTOR

UNITED STATES PATENT OFFICE.

GEORGE B. WEBB, OF NEW YORK, N. Y., ASSIGNOR TO FRANK J. TINKHAM, OF SAME PLACE.

MEASURING-FAUCET.

SPECIFICATION forming part of Letters Patent No. 629,834, dated August 1, 1899.

Application filed January 18, 1898. Serial No. 667,030. (No model.)

*To all whom it may concern:*

Be it known that I, GEORGE B. WEBB, a citizen of the United States, residing at New York, in the county of New York and State of New York, have invented certain new and useful Improvements in Measuring-Faucets; and I do hereby declare the following to be a full, clear, and exact description of the invention, such as will enable others skilled in the art to which it appertains to make and use the same, reference being had to the accompanying drawings, and to letters and figures of reference marked thereon, which form a part of this specification.

This invention relates to that class of faucets by which beer or other liquids, and more particularly liquids under pressure, may be drawn or measured out from the cask or other containing-package; and the objects of the invention are to effect an accurate measurement of the liquid drawn out, to provide a faucet for that purpose which shall be simple and easily constructed, but at the same time durable and not liable to be obstructed in its action by the liquid or any sediment therefrom, and to secure other advantages and results, some of which may be referred to hereinafter in connection with the description of the working parts.

The invention consists in the improved measuring-faucet herein described and in the arrangements and combinations of parts of the same, all substantially as will be hereinafter set forth, and finally embraced in the clauses of the claim.

Referring to the accompanying drawings, in which like letters of reference indicate corresponding parts in each of the several views, Figure 1 is a side view of my measuring-faucet, showing in outline the interior arrangements thereof. Fig. 2 is a top view of a portion of the same. Fig. 3 is a central vertical longitudinal section of the faucet and its various parts. Fig. 4 is a top view of a portion of the faucet with the indicating hand and dial removed. Fig. 5 shows a strainer-disk to be placed over the end of the supply-pipe, and Fig. 6 shows a certain bearing-ring to be inserted in the forward end of the faucet.

In said drawings, $a$ indicates the body portion of the faucet, which is irregularly tubular and preferably somewhat elbow-shaped in order to give a proper inclination to the spout $b$, from which the liquid issues. The opposite or rear end $c$ is normally horizontal when in operative position and is adapted to be secured against a suitable wall or partition of any kind and receive the liquid from a package suitably disposed at any convenient point behind said partition. For this purpose the extremity of the end $c$ is interiorly threaded, as at $c'$, to screw onto a correspondingly-threaded pipe-section $d$, which extends through said partition. An ornamental collar or ring $e$ loosely surrounds the projecting threaded end of said pipe-section $d$ and is adapted to be engaged by the end $c$ of the body portion of the faucet and be pressed firmly against the partition by the screwing on of said body portion. The end of the pipe-section $d$ which projects at the rear of the partition is threaded, as at $d'$, and receives a nut $f$, adapted to be screwed tightly against the partition to hold the pipe-section $d$ firmly in place.

Against the end of the pipe-section $d$ is laid a perforated strainer-disk $g$ to prevent any foreign substances in the liquid from passing into the faucet, and also the exteriorly-flanged end of a short brass tube $h$, to which a supply-pipe may be attached by any suitable means. A coupling-piece $i$, having at one end a rim $i'$, projecting radially inward to engage the flanged end of said tube $h$, screws onto the end of pipe-section $d$ and holds said tube $h$ and strainer-disk $g$ in place. Suitable gaskets or washers (not shown) may be inserted to make a tight joint.

At the bend in the body portion $a$ of the faucet said body portion is somewhat enlarged downward and at the sides and an integral seat provided for a tapering plug-valve $j$. Said valve forms an impervious ground joint with its seat or sheath after the manner common in such valves and has a passage or perforation $k$, adapted to be brought into coincidence with the passage $l$, extending through the faucet. The smaller end of the plug-valve $j$ projects from its seat or sheath and receives a short stiff spiral spring $m$, Fig. 4, and a nut $n$, by which said plug-valve is held with elastic firmness in its place. At the opposite or larger end said valve is provided with a suitable handle o, Fig. 2, of any ordinary construction, and with a radially-projecting pin p, which works in a recess p', cut in the edge of the valve seat or sheath and engages the opposite ends thereof to prevent undue oscillation of the valve, as will be understood.

The forward-inclined end b of the faucet is exteriorly threaded at its extremity to receive a spout or nozzle q, from which the liquid may issue. The extremity of the end b of the faucet is further interiorly recessed or bored out to a larger diameter for a short distance, as at r, to provide a seat for a bearing-ring r'. Said ring r' is formed of a flat strip of elastic metal bent into circular shape, but not having its contiguous ends joined, as will be more clearly understood by referring to Fig. 6. At one point on the circumference of said ring a fold or loop r'' is formed, which extends radially inward and has an aperture or bearing r''' at the end of said fold or loop and at the center of the ring. Said ring being inserted in its seat r retains its position by its own expansive elasticity and provides a central bearing r''' for the lower end of the shaft s of a fan-wheel, similar in shape to what is sometimes employed in propellers, longitudinally arranged within the tubular end b of the body portion of the faucet. Said fan-wheel consists of a series of blades s', radially projecting from the shaft s near its lower end and twisted out of a plane passed through said shaft in a manner common to propeller-blades to be engaged by the outflowing liquid. At its upper end the shaft s passes through a passage-way t, bored through the integral partition a', and projects into a chamber 2, containing the indicating mechanism. This chamber 2 is formed in the upper part of an integral extension 22 of the body portion of the faucet, said extension projecting forwardly and upwardly from the "elbow" of the body portion and said chamber being separated from the flow-passage of the faucet by the bottom or integral partition a'. The extension 22 is of a cylindical shape in cross-section and at its upper end is exteriorly threaded to receive a rim 3, which holds in place a glass plate 4, covering the chamber 2. The inner walls of the chamber are recessed, as at 5, to receive a packing-ring 6 and a dial-plate 7. A plate 8, suitably secured by screws to a lug or lugs 9 on the side of the chamber, projects into the center of the chamber and forms a bearing for the upper end of a central vertical arbor 10, having a bearing 11 in the bottom of the chamber. Said arbor 10 carries near its lower end a worm-wheel 12, keyed thereto, said worm-wheel being engaged by a coöperating worm 13 on the upper end of the fan-wheel shaft s.

At its upper extremity, above the dial-plate, the vertical arbor 10 carries a hand 14, which is adapted to indicate on the dial-plate 7 the quantity of liquid drawn out through the faucet. This dial, because of the inclined position of the extension 22, is forwardly slanted, and thus is more conveniently read by the observer. An arm 15 projects from a lug 16, suitably disposed on the inner wall of the chamber 2, and is bent downward and perforated near its end to provide a bearing for the upper end of the fan-wheel shaft.

The operation of my faucet is as follows: When the plug-valve j is turned to bring the opening k into alinement with the passage l, the liquid flows through the faucet and, striking the fan-wheel blades s', causes the fan-wheel and its shaft s to rotate. This motion is imparted to the worm-wheel 12 and thence to the arbor 10 and indicating-hand 14, which hand shows on the dial-plate the amount of liquid passing through the faucet. Since this faucet is intended more particularly to be used in connection with liquids under uniform pressure, it is evident that uniform velocity will be given to the fan-wheel as the liquid flows out, and accurate measurements are thus secured. At the junction of the passages l and l' a somewhat contracted throat $l^3$ is preferably formed, and it is in the back part of this throat, adjacent to the end of the passage l, that the valve or stop-cock j is placed. The valve j is designed to be at all times turned to the limit of its movement in the direction in which it is being oscillated, and to increase or diminish the flow of liquid through the faucet an elastic strip of metal 26 is placed longitudinally in the throat $l^3$ just forward of the valve j and secured to the wall of the passage by a screw 17. The free end of said strip 26 points toward the outlet q and is engaged on its outer side by an adjusting-screw 18, extending through the wall of the passage from the outside. By turning said screw 18 the strip 26 may be made to project a greater or less distance into the passage l, and thus vary in a corresponding degree the flow of liquid.

The passage-way t, bored through the body portion a, for the fan-wheel shaft s, is at its lower end enlarged, as at 19, and has in communication with the inner end of said enlargement an air-vent 20. Said air-vent 20 permits the liquid to flow quickly and entirely out of the end b of the faucet when the valve j is closed, thus avoiding dribbling.

It will be noted that the stop-cock j is placed at the forward end of the horizontal passage l and back from the fan-wheel and all apertures or opportunities for leakage, so that there can be no escape of liquid when said stop-cock is closed.

Having thus described the invention, what I claim as new is—

1. In a measuring-faucet, the combination with a tubular body portion having a fan-wheel longitudinally pivoted therein, of a bearing-ring inserted in a recess formed in the interior surface of said tubular body portion, said bearing-ring consisting of an elastic strip of metal bent to conform to the walls of the passage in said tubular body and having a loop or fold projecting radially inward from the circumference with an eye or socket at the end of said loop or fold for said fan-wheel, substantially as set forth.

2. In the measuring-faucet herein described, the combination of a body portion having an upper chamber, a lower flow-passage and a perforated integral partition between said chamber and passage, a fan-wheel arranged in said passage and having its shaft projecting through the perforation in said partition into said chamber, a bearing-ring for said shaft arranged in said passage, and an arm projecting from the inner surface of said chamber and providing bearing for the upper end of said shaft, substantially as set forth.

3. The combination of an elbow-shaped tubular body portion adapted to be connected at one end to the source of supply and to discharge liquid from the other end, a chamber for registering mechanism formed above the bend in said body portion and registering mechanism therein, a fan-wheel pivoted in the forwardly and downwardly inclined arm of the body portion and having a shaft extending upward through the wall of the flow-passage into the said chamber and connecting with the registering mechanism, the perforation for said shaft being enlarged for a short distance in from the flow-passage and communicating with the open air by a lateral aperture, an elastic ring arranged inside of the forwardly and downwardly inclined passage and providing a bearing for the lower end of the fan-wheel shaft, a regulating-strip fastened at one end flatwise against the interior wall of the flow-passage and an adjusting-screw for forcing the other end out from the wall to obstruct the flow-passage, and a stop-cock for shutting off the flow of liquid at a point nearer the source of supply than said regulating-strip, fan-wheel-shaft perforation and fan-wheel, substantially as set forth.

In testimony that I claim the foregoing I have hereunto set my hand this 17th day of January, 1898.

GEORGE B. WEBB.

Witnesses:
W. F. BOGART,
F. J. TINKHAM.